United States Patent [19]

Martin

[11] 4,266,648
[45] May 12, 1981

[54] HYDRAULICALLY ACTUATED FRICTION CLUTCH, ESPECIALLY LAMELLAE CLUTCH AUTOMATIC TRANSMISSIONS OF MOTOR VEHICLES

[75] Inventor: Harry Martin, Neuried, Fed. Rep. of Germany

[73] Assignee: Bayerische Motoren Werke Aktiengesellschaft, Fed. Rep. of Germany

[21] Appl. No.: 891,627

[22] Filed: Mar. 30, 1978

[30] Foreign Application Priority Data

Apr. 1, 1977 [DE] Fed. Rep. of Germany ....... 2714500

[51] Int. Cl.³ .............................................. F16D 25/06
[52] U.S. Cl. ........................... 192/85 AA; 192/109 F; 92/107
[58] Field of Search ........... 192/109 F, 85 A, 85 AA, 192/87.17, 52; 92/107, 108; 188/72.4, 347, 366

[56] References Cited

U.S. PATENT DOCUMENTS

| 2,632,544 | 3/1953 | Hockert | 192/87.17 |
|---|---|---|---|
| 2,920,732 | 1/1960 | Richards et al. | 92/107 |
| 3,032,157 | 5/1962 | Richards | 92/107 |
| 3,064,780 | 11/1962 | Richards et al. | 92/107 |
| 3,094,203 | 6/1963 | Jania et al. | 192/85 AA |
| 3,202,253 | 8/1965 | Merritt et al. | 192/85 AA |
| 3,237,404 | 3/1966 | Flanigan et al. | 192/85 AA |
| 3,262,531 | 7/1966 | Black et al. | 192/85 AA |
| 3,789,961 | 2/1974 | Warwick | 92/108 |

FOREIGN PATENT DOCUMENTS 231766  6/1963  Austria ................... 192/87.17

*Primary Examiner*—Kenneth Dorner
*Attorney, Agent, or Firm*—Craig & Antonelli

[57] ABSTRACT

A hydraulically actuated friction clutch, especially a lamellae clutch for automatic transmissions of motor vehicles, with a cylinder-piston unit whose interior space is subdivided into chambers by means of a ring-shaped extension provided at the cylinder bottom; the extension thereby projects into an annular channel provided in the piston and at least one further chamber is formed by way of interconnected sealing elements.

10 Claims, 1 Drawing Figure

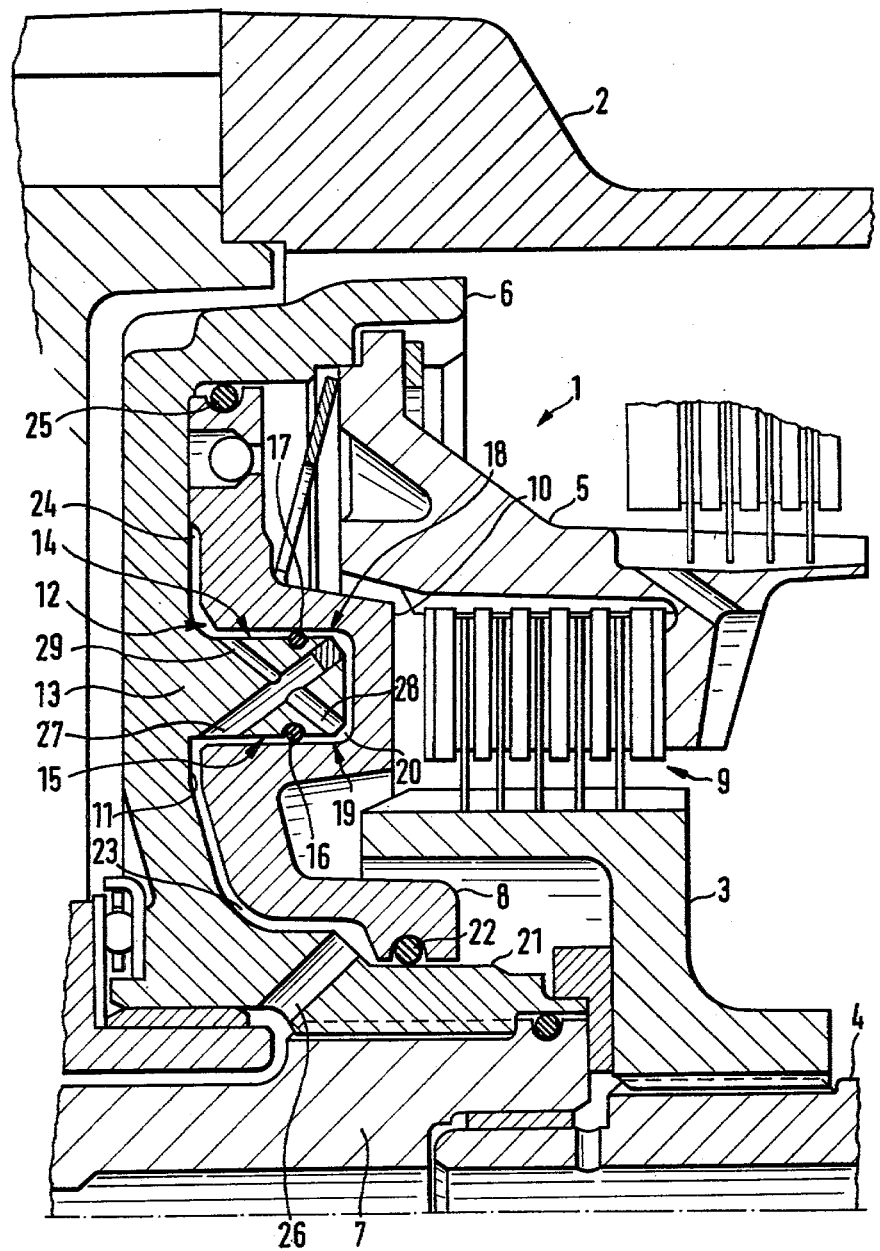

HYDRAULICALLY ACTUATED FRICTION CLUTCH, ESPECIALLY LAMELLAE CLUTCH AUTOMATIC TRANSMISSIONS OF MOTOR VEHICLES

The present invention relates to a hydraulically actuated friction clutch, especially to a lamellae clutch for automatic transmissions of motor vehicles, with a cylinder-piston unit, whose interior spaces are subdivided into chambers by means of a ring-like extension provided at the cylinder bottom.

A lamellae clutch with a cylinder-piston unit of the type described hereinabove is known from the German Auslegeschrift No. 15 55 340. This cylinder-piston unit includes two chambers, which are actuated sequentially by a pressure fluid. This stepwise increase of the clutch pressure produces an improvement of the quality of the shifting operation as a result of a reduced engagement shock. The engagement shock can be further reduced by a larger number of pressure chambers.

The present invention is concerned with the task to realize in a friction clutch with a cylinder-piston unit of the aforementioned type, a further chamber actuatable by the pressure fluid in a simple manner and with structurally lowest possible expenditure.

The underlying problems are solved according to the present invention in that the extension projects into an annular channel provided in the piston and in that a further chamber is formed by interposed sealing elements.

The advantage of the present invention resides in the construction of a further pressure chamber realized with structural lowest possible expenditures.

Accordingly, it is an object of the present invention to provide a hydraulically operated friction clutch, especially a lamellae clutch for automatic transmissions of motor vehicles, which avoids by simple means the aforementioned shortcomings and drawbacks encountered in the prior art.

Another object of the present invention resides in a hydraulically actuated friction clutch, especially in a lamellae clutch for automatic transmissions of motor vehicles, which further reduces the engagement shocks by extremely simple and operationally effective means.

A further object of the present invention resides in the hydraulically actuated friction clutch, in which a further chamber actuatable by the pressure fluid is realized with structurally lowest possible expenditures.

Still another object of the present invention resides in a friction clutch of the type described above which utilizes relatively few parts of simple construction that can be readily assembled to achieve improved operating characteristics.

These and further objects, features and advantages of the present invention will become more apparent from the following description when taken in connection with the accompanying drawing which shows, for purposes of illustration only, one embodiment in accordance with the present invention, and wherein:

The single FIGURE is a partial cross sectional view through a hydraulically actuated lamellae clutch in accordance with the present invention for automatic transmissions of motor vehicles.

Referring now to the single FIGURE of the drawing, a hydraulically actuated lamellae clutch generally designated by reference numeral 1 for an automatic transmission 2 (not shown in detail) of a motor vehicle is shown in cross section in this drawing. The lamellae clutch 1 includes an inner lamellae carrier or support 3 which is non-rotatably connected with an output shaft 4 leading to the mechanical transmission part. An outer lamellae carrier or support 5 is non-rotatably connected by way of a pot-shaped cylinder 6 with a drive shaft 7 flangedly connected with the turbine of a hydrodynamic converter (not shown). An essentially ring-disk-shaped piston 8 slides within the cylinder 6. The piston 8 includes a ring-shaped projection 10 on its side facing the lamellae set 9, by means of which the piston 8 presses against the lamellae set 9 with an engaged lamellae clutch 1. On its side facing the cylinder bottom 11, the piston 8 includes an annular channel 12. Preferably the annular channel 12 is provided within the area of the projection 10 as a result of which the piston 8 has approximately the same wall thickness throughout in an advantageous manner. A ring-like extension 13 provided at the cylinder bottom 11 projects into the annular channel 12. The extension 13 which is constructed closed in the circumferential direction includes cylindrical annular surfaces 14 and 15. Grooves are formed in the annular surfaces 14 and 15 for the accommodation of sealing rings 16 and 17. The sealing rings 16 and 17 arranged in the grooves provided within the extension 13 cooperate sealingly with the cylindrical walls 18 and 19 of the annular channel 12 and delimit a chamber 20 in the annular channel 12. On the other hand, the sealing ring 16, together with a sealing ring 22 mounted on the cylinder 6 between the piston 8 and the hub 21, delimits an inner chamber 23. An outer chamber 24 is delimited by the annular sealing ring 17 as well as by an annular sealing ring 25 arranged at the outer circumference of the piston 8.

For actuation of the lamellae clutch 1, pressurized oil is fed essentially unthrottled to the inner chamber 23 by way of bores 26 in the hub 21. The piston 8 bridges the distance to the lamellae set 9 very rapidly and compresses the same with a still small force. With the beginning of the pressure build-up in the inner chamber 23, the pressurized oil enters into bores 27 arranged in the extension 13. These bores 27 may already be smaller in diameter compared to the hub bores 26. The bores 27 extend each diagonally in the extension 13 having essentially a rectangular cross section and are closed off at the end facing the middle chamber 20. The pressurized oil enters from these dead-end bores 27 by way of throttle bores 28 into the center chamber 20 and by way of throttle bores 29 into the outer chamber 24. The throttle bores 29 leading to the outer chamber 24 are smaller in diameter than the throttle bores 28 leading to the center chamber 20 in the annular channel 12. The throttle bores 28 and 29 are aligned with one another, whereby their common axis extends diagonally through the extension 13 and thereby intersects the dead-end bore 27. After a maximum pressure has built-up in the inner chamber 23 which is hydraulically supplied first, a higher pressure will also establish itself in the middle chamber 20 with a time delay effected by the throttle bores 28. The piston 8 now presses with an increased force against the lamellae set 9. The filling of the outer chamber 24 takes place by way of the throttle bores 29 having the smallest cross section, whence the full pressure is reached last in this chamber 24. If the full pressure has established itself in the chamber 24, then the piston 8 compresses the lamellae set 9 with maximum force.

The described construction of the pressure chambers in an advantageous manner is simple and is realized with few additional parts and materials. Additionally, it is of advantage that the cylinder-piston unit for the lamellae clutch constructed according to the present invention can be manufactured in a relatively simple manner. Finally, the inner space of a cylinder-piston unit may also be subdivided into more than three chambers in that several extensions at the cylinder bottom project into several annular channels in the piston and chambers are formed by interposed sealing elements. Moreover, a cylinder-piston unit which heretofore has been operable as single-stage unit can be converted by the present invention into a multi-stage operating unit for the reduction of the engaging shock without change of the major dimensions.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydraulically activated friction clutch, comprising a cylinder-piston unit with a cylinder having a bottom whose interior space is subdivided into first and second chamber means by means of a ring-like extension provided at the cylinder bottom, and a piston formed with an annular channel means into which said ring-like extension projects, seal means being provided for sealing between said annular channel means and said ring-like extension to form a third chamber means in said annular channel means, and bore means being provided in said ring-like extension for providing hydraulic fluid communication between said first, second and third chamber means.

2. A friction clutch according to claim 1, characterized in that the friction clutch is a lamellae clutch for automatic transmissions of motor vehicles.

3. A friction clutch with friction disks according to claim 1, wherein said piston presses against the friction disks by way of a ring-shaped projection, and wherein said annular channel means is provided within the area of the projection.

4. A friction clutch according to claim 1 or 3, characterized in that the extension includes cylindrical annular surface means and in that grooves are provided in the annular surface means for receiving the seal means in the form of sealing rings.

5. A friction clutch according to claim 4, characterized in that said bore means in the extension includes at least one dead-end bore operatively connected with said first chamber means which is hydraulically supplied first, said dead-end bore being operatively connected with said second and third chamber means by way of throttle bore means.

6. A friction clutch according to claim 5, characterized in that the throttle bore means leading to said second chamber means is smaller in diameter than the throttle bore means leading to said third chamber means in the annular channel means.

7. A friction clutch according to claim 6, characterized in that the two throttle bore means are substantially aligned with one another and intersect a respective dead-end bore.

8. A friction clutch according to claim 1, characterized in that said bore means in the extension includes at least one dead-end bore operatively connected with said first chamber means which is hydraulically supplied first, said dead-end bore being operatively connected with said second and third chamber means by way of throttle bore means.

9. A friction clutch according to claim 8, characterized in that the throttle bore means leading to said second chamber means is smaller in diameter than the throttle bore means leading to said third chamber means in the annular channel means.

10. A friction clutch according to claim 9, characterized in that the two throttle bore means are substantially aligned with one another and intersect a respective dead-end bore.

* * * * *